(12) United States Patent
Guirard

(10) Patent No.: US 8,316,034 B2
(45) Date of Patent: Nov. 20, 2012

(54) ANALYZING BINARY DATA STREAMS TO IDENTIFY EMBEDDED RECORD STRUCTURES

(75) Inventor: Andre P. Guirard, Plymouth, MN (US)

(73) Assignee: International Business Machines Corporaion, Armonk, NY (US)

(*) Notice: Subject to any disclaimer, the term of this patent is extended or adjusted under 35 U.S.C. 154(b) by 67 days.

(21) Appl. No.: 12/908,018

(22) Filed: Oct. 20, 2010

(65) Prior Publication Data

US 2012/0102056 A1 Apr. 26, 2012

(51) Int. Cl.
*G06F 17/30* (2006.01)
(52) U.S. Cl. ........................................ 707/755
(58) Field of Classification Search .............. 707/2, 100, 707/755; 370/412
See application file for complete search history.

(56) References Cited

U.S. PATENT DOCUMENTS

| | | | |
|---|---|---|---|
| 5,822,511 A | 10/1998 | Kashyap et al. | |
| 6,282,698 B1 | 8/2001 | Baker et al. | |
| 6,707,693 B1 | 3/2004 | Ichiriu | |
| 6,839,724 B2 | 1/2005 | Manchanda et al. | |
| 7,503,038 B2 | 3/2009 | Pandit et al. | |
| 7,555,747 B1 | 6/2009 | Agesen | |
| 2003/0076849 A1* | 4/2003 | Morgan et al. | 370/412 |
| 2005/0234997 A1 | 10/2005 | Gu et al. | |
| 2006/0218160 A1* | 9/2006 | Bhatia | 707/100 |
| 2010/0095129 A1 | 4/2010 | Wilson | |

* cited by examiner

*Primary Examiner* — Etienne Leroux
(74) *Attorney, Agent, or Firm* — Douglas H. Lefeve; Edell, Shapiro & Finnan, LLC

(57) ABSTRACT

According to one embodiment of the present invention, a system identifies and extracts data structures embedded within a data stream, and comprises a computer system including at least one processor. The system analyzes the data stream and identifies data structure definitions corresponding to analyzed data stream portions. The data structure definitions each define a structure of a corresponding data structure, and are configurable to accommodate various types of data structures within the data stream. The corresponding data structures within the data stream are generated by extracting information from the data stream in accordance with the data structure definitions. Embodiments of the present invention further include a method and computer program product for identifying and extracting data structures embedded within a data stream in substantially the same manner described above.

24 Claims, 8 Drawing Sheets

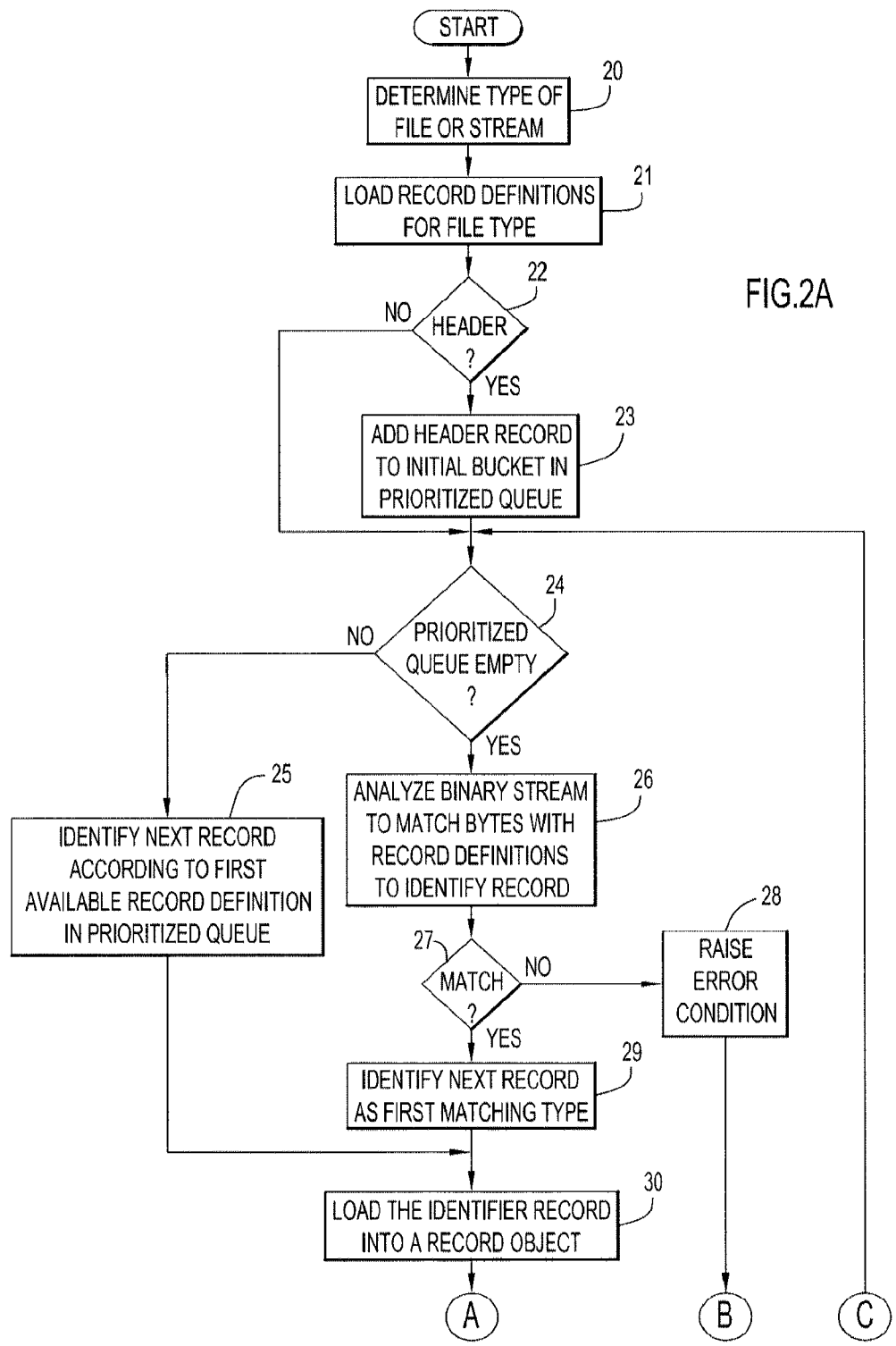

| CODE | ITEMS | LEN | DESCRIPTION | CLASSNAME | PROPERTIES | QUEUE RULES | COMMENT | DONTCARE | UNALIGN |
|---|---|---|---|---|---|---|---|---|---|
| 42 | 44 | 46 | 48 | 50 | 52 | 54 | 56 | 58 | 60 |
| H | $ViewFormat | 10 | VIEW_TABLE_FORMAT | CDViewTableFormat | W/2/Columns W/4/SeqNo W/6/Flags W/8/Flags2 | VIEW_COLUMN_FORMAT/Columns/0 VIEW_TABLE_FORMAT2/1/1 VIEW_COLUMN_FORMAT2/Columns/1 Flags2&40?VIEW_TABLE_FORMAT3/1/1 VIEW_TABLE_FORMAT4/1/3 CDMAYBE:FFF6,FF71/1/4 | \<Columns\> cols | SeqNo Flags&=FBFF Flags1&100?Flags 2&=FFEF | |

ANALYZING BINARY DATA STREAMS TO IDENTIFY EMBEDDED RECORD STRUCTURES

BACKGROUND

1. Technical Field

The present invention relates to interpretation of data streams, and more specifically, to analyzing binary data streams to identify and extract embedded record structures contained within those streams. The resulting extracted record structures may be examined for various applications (e.g., record equivalency, file comparisons, extraction of particular types of data within the records, etc.).

2. Discussion of the Related Art

When a file is organized into binary records, there are practically infinite ways in which the data can be organized and the different parts interpreted. Accordingly, the task of identifying the record structures in the binary file or data stream, or blocking of the file into records of contiguous structured data, becomes complex. For example, an initial difficulty with interpretation of the binary data stream relates to dividing the binary file or data stream into records.

In the simplest case, there may be a distinct set of records with a fixed length and a pre-defined order, thereby enabling interpretation of the binary file in a straightforward manner. For example, the contents of records, other than text, tend to be arranged in fixed-size blocks, consisting of fields of consecutive bytes which are of several basic datatypes (e.g., binary integers of different byte lengths, the same integers but with their bytes in reverse order, floating-point numbers of four or eight bytes, packed decimal values (e.g., where each four-bits represents a decimal digit, and where there may be an assumed decimal point), decimal string values (e.g., where text in a particular character set (generally but not necessarily ASCII) is to be converted to a number during use. This may involve specification of the expected decimal point character and thousands separator), date/time values in a variety of standard formats, bit flags (e.g., where every individual bit of one or more consecutive bytes is interpreted as a true/false value), packed binary numbers (e.g., where a number may be three bits long (having possible values 0 thru 7) with two of these in a byte, thereby providing two bits left over), unused bytes which are reserved for later use or to fill space (e.g., to provide a length that is divisible by two or four bytes), user-defined field, etc.).

However, these types of simple files are rare. If the file contains text data or other stream data, records with variable lengths are common, where the length of the record varies based on the length of the text or other stream data. In these cases, a record may contain a fixed-length part, and a variable-length part (that may or may not immediately follow the fixed-length part), thereby complicating interpretation of the binary file or data stream. Further, character data is complicated by the possibility of the text being in any of hundreds of standard character sets.

In addition, systems may translate complex streams of binary record data into an alternate representation, and subsequently translate the alternate representation back into binary data. The translated and original records (or binary data) may be compared to determine whether the translated and original records are exactly identical. However, this simplistic comparison is limited to determining an exact match, and is generally inadequate for cases where the translated records may still be functionally equivalent for an application without being identical to the original records.

BRIEF SUMMARY

According to one embodiment of the present invention, a system identifies and extracts data structures embedded within a data stream, and comprises a computer system including at least one processor. The system analyzes the data stream and identifies data structure definitions corresponding to analyzed data stream portions. The data structure definitions each define a structure of a corresponding data structure, and are configurable to accommodate various types of data structures within the data stream. The corresponding data structures within the data stream are generated by extracting information from the data stream in accordance with the data structure definitions. Embodiments of the present invention further include a method and computer program product for identifying and extracting data structures embedded within a data stream in substantially the same manner described above.

BRIEF DESCRIPTION OF THE SEVERAL VIEWS OF THE DRAWINGS

FIGS. 2A-2B are a procedural flowchart illustrating a manner in which a binary file or data stream is analyzed to identify record structures within that file according to an embodiment of the present invention.

FIG. 3A is an illustration of an example record definition according to an embodiment of the present invention.

FIG. 7 is a schematic illustration of an example graphical user interface screen presenting results of a comparison between original and translated records according to an embodiment of the present invention.

DETAILED DESCRIPTION

Figure 1:
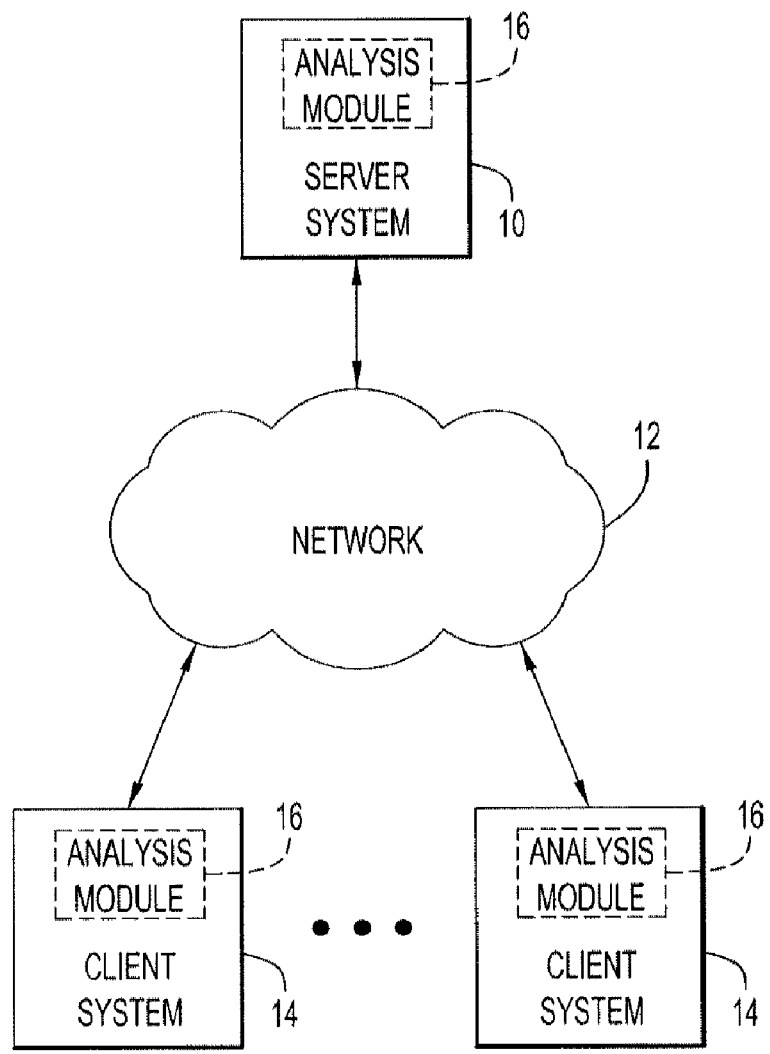
FIG. 1 is a diagrammatic illustration of an example computing environment for use with an embodiment of the present invention.

Present invention embodiments are directed towards analyzing a binary file or data stream to identify data and/or other structures contained therein. Present invention embodiments may further be utilized to compare two streams of complexly formatted binary data each containing data structures, identify differences between the structures, and produce a report of only those differences deemed important. This enables a user viewing the results to quickly identify those areas of significant difference.

Present invention embodiments employ a rule-based description of data formats in order to interpret the binary data file. This technique flexibly describes the formatting of a binary data file to enable the same core program code to dynamically interpret a large variety of different data formats. These data format descriptions or definitions may be stored in a configuration table or an external configuration file. Conventional techniques typically require knowledge of the data format at the time the program code is written, where accommodation of new types of binary files requires new program code. However, present invention embodiments may accommodate new binary files without new program code by adding and/or adjusting the data format definitions. In addition, present invention embodiments further employ a prioritized queue to keep track of record sequences within the binary data file.

Present invention embodiments may further be utilized to compare original and translated records. For example, complex streams of binary record data may be translated into an alternate representation (e.g., XML, etc.) and back into binary data. Present invention embodiments support the comparison of the original data with the translated data to determine functional equivalency. In other words, present invention embodiments determine whether the differences between the original data and the translated data are sufficient to affect the behavior of a system that uses the binary record data to control its operation. This is useful for testing the translation process for errors that affect operation. Basically, present invention embodiments automatically categorize encountered differences between the translated and original records as significant (e.g., to be reported) or insignificant (e.g., to be ignored). The differences that are ignored may be on the level of a single bit or byte, may include variant versions of the same record (e.g., produced by different versions of a software system), and may involve fields whose position and length within the record are variable. These ignored differences may further include whole records which may be present in the original stream and missing in the translated stream, or vice versa. The information to determine whether a difference is significant may be within the record itself or in a previous record.

The categorization of differences as insignificant requires knowledge of the system that uses the data, and human intelligence. Accordingly, present invention embodiments support a rule base of specialized knowledge about the data being handled, combined with a flexible architecture to permit program coding of exceptions that are too complicated for the rule-based system to support. The task is generalized to minimize the number of rules that must be coded in favor of rules that are stored in a configuration file.

Present invention embodiments enable complex rules to be defined. For example, the rules may refer to other fields in the same or other records to determine whether a difference in a current field is significant, and may further refer to partial results calculated by custom program code added to the original system. Further, the rules may define the parts of a binary record that are unused or irrelevant. This prevents irrelevant data from appearing in a report, and indicates the record portions in which differences are to be ignored for comparisons. The format for reporting differences enables a user to easily identify the relevant portions and presents those portions in context with a summary of the remaining portions of the two data streams representing the original and translated records.

Moreover, a user may view a resulting report that lists differences between the original and translated data streams. If the user determines that a particular difference is unimportant, a rule may be encoded to remove that difference (and other similar differences) from the report. Accordingly, the analysis can be controlled to present the differences deemed important, while providing an improved rule base for enhancing efficiency of the next comparison.

In addition, present invention embodiments provide an innovative object-oriented architecture that enables the system to be extended with small amounts of additional program code to handle special cases which are too complex for the rule language. The hierarchy of objects representing record types and property types or fields enables incorporation of a record or field exhibiting some unusual behavior without having to provide program code for the entire behavior of the analysis. Alternatively, since modern computing languages, such as such as Java™, allow for interpretation of source code at runtime, this code may be inserted into the configuration file and executed using an API for accessing record properties and the contents of related records. (Java and all Java-based trademarks and logos are trademarks of Sun Microsystems, Inc. in the United States, other countries, or both.) If performance becomes an issue, the code would be incorporated into the pre-compiled system. Further, the addition of pre-compiled modules that extend supplied classes may be loaded (as needed) and their class names referenced in declarative notation. The combination of the declarative representation in combination with small amounts of program code built on base classes provides an easy manner to handle exceptional cases.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to provide binary data files or streams to server systems 10 for various applications (e.g., analysis of binary file contents, file comparisons, functional equivalency of records, etc.). The server systems include an analysis module 16 to analyze the received binary information and produce reports in accordance with the particular application. The client systems may present a graphical user (e.g., GUI, etc.) or other interface (e.g., command line prompts, menu screens, etc.) to solicit information from users pertaining to the desired data and analysis, and to provide the resulting reports.

Server systems 10 and client systems 14 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, analysis module, browser/interface software, etc.). In addition, analysis module 16 may include one or more modules or units to perform the various functions described below (e.g., retrieving binary data and record definitions, comparison of binary data to the record definitions, identifying records within the binary stream, processing rules, comparing records within different streams, determining record status, generating various reports, etc.), and may be implemented by any combination of any quantity of software and/or hardware modules or units.

Alternatively, one or more client systems 14 may process binary data streams or files when operating as a stand-alone unit. In a stand-alone mode of operation, the client system stores or has access to the binary files or data stream, and includes analysis module 16 to analyze the binary information and produce reports in accordance with the particular application. The graphical user (e.g., GUI, etc.) or other interface (e.g., command line prompts, menu screens, etc.) solicits information from a corresponding user pertaining to the desired data and analysis, and provides the resulting report.

Analysis module 16 (e.g., via server system 10 and/or client system 14) analyzes a binary file or data stream. The file may be of various file types, and may include data and several data structures. The analysis module basically decomposes the binary data stream into records, and identifies the record type of each record. This task covers a situation where records can be identified and their lengths determined based on the record contents (e.g. where the record contains a header identifying the type and length). In addition, the task covers the situation where this information may be ascertained from other records. For example, a certain header record at the beginning of the stream is expected, and the sequence of subsequent records is based on information in prior records. This may further include situations where one record identifies another record to occur far downstream (e.g., after an unknown number of other records for which the data to determine their existence is not yet available).

In order to accommodate the above situations, the analysis module employs various techniques. In particular, record-based information is flexibly described to allow a variety of record types to be handled without writing specialized program code for each record. Further, the configuration information describing each record may include the name of an object-oriented class that handles any special processing associated with that record type, and rules listing follow-on records, where the rules may be conditional based on information in that or previous records.

Moreover, an architecture is employed to support extending the design to handle additional record types not supported by the rule-based configuration. An object-oriented architecture associates an object of a record class with each binary record. The record class, depending on the record type, may be of a derived class to implement any functionality that the rule-based configuration cannot handle. These derived classes should be seldom used to support maximum flexibility to make changes and add new record types without modifying program code. In other words, the descriptive notation of record definitions is flexible enough to minimize use of custom program code.

In addition, a prioritized queue is employed for queuing records expected later in the binary stream in an expected order. This supports situations where new expected records need to be inserted into the middle of the current list of expected records. In order to identify a next record in the stream, the oldest queue entry among the group with the highest priority is ascertained. This technique allows easy configuration of rules governing very complex ordering of records, without having to write specific program code for those situations.

Figure 2B:
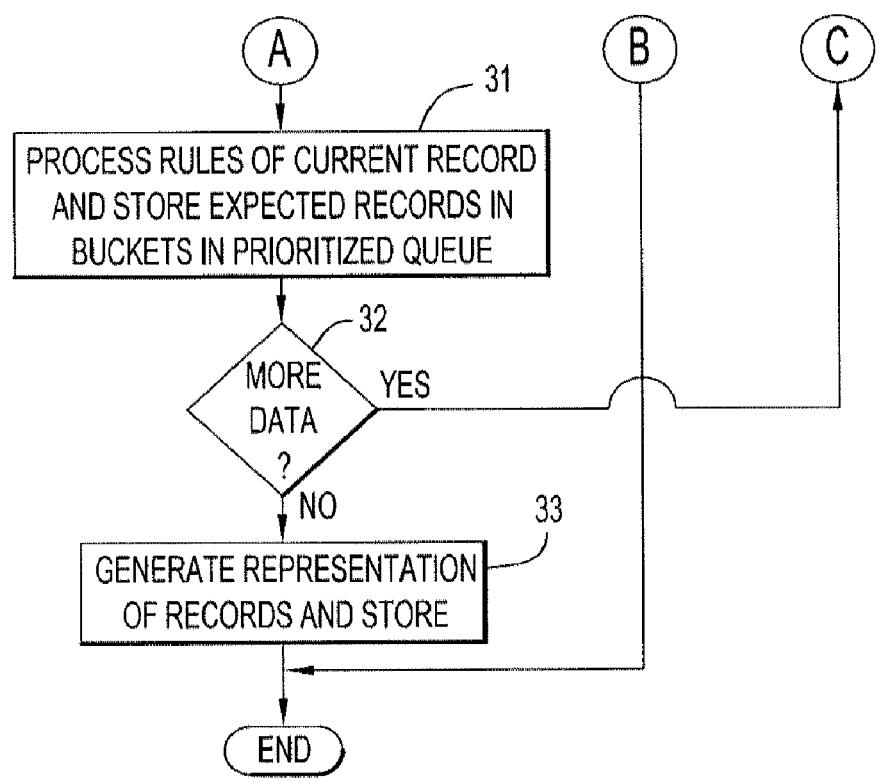

A manner in which analysis module 16 (e.g., via server system 10 and/or client system 14) analyzes a binary data file or stream to determine the file contents according to an embodiment of the present invention is illustrated in FIGS. 2A-2B. Initially, the binary file may represent a file of various types, where each file type includes certain record structures. The type (e.g., .gif, .pdf, etc.) for the binary file or stream is determined at step 20 in order to determine the record structures appropriate for the file. The file type may be ascertained from the extension (or file type) of the file name. The definitions for various record structures may be stored in a configuration table or file and applied based on the file type (e.g., as determined by file suffix or pattern matching the first few bytes of the file).

Once the file type is determined, the record definitions for the determined file type are identified or loaded at step 21. Portions of the binary file are retrieved at step 22 and compared to record definitions to determine the presence of a header record. The record definitions are preferably stored in one or more configuration tables, but may alternatively be stored in other structures or files (e.g., XML description, etc.). When a header record is identified, the header record information is extracted from the binary data in accordance with the corresponding record definition and stored.

The record definition provides the structure and arrangement of the record and a mapping of record fields to the binary data. Referring to FIG. 3A, an example record definition 40 includes information pertaining to the record structure. For example, the record definition may include a code field 42, an items field 44, a length field 46, a description field 48, a class field 50, a properties field 52, a rules field 54, a comment field 56, an ignore field 58, and an alignment field 60. Code field 42 indicates the type of record. By way of example, the value of "H" in this field (e.g., as viewed in FIG. 3A) designates the record as a header for the source type listed in items field 44. The items field identifies the expected record type. For example, the header record type applies when a "$ViewFormat" item is encountered (e.g., as viewed in FIG. 3A).

Length field 46 indicates the length of the record (e.g., the record has a fixed length of 10 bytes as viewed in FIG. 3A). If a value for this field is omitted, the length value may be determined in another manner (e.g., reading the length from a standard record header, a manner defined by the class designated to handle this type of record, etc.). Description field 48 indicates the name by which the record is known for reporting and reference purposes (e.g., referencing the record in the configuration table or in the program code). Class field 50 indicates the name of an object-oriented class which handles this specific record type. In addition to a generic type of class which may define the default behavior, other classes may be used for multiple types of records. For example, a class may expect the record length to be encoded in the first word of a record, or a class may be specific to a particular record type (e.g., "CDViewTableFormat" as viewed in FIG. 3A).

Properties field 52 indicates the fields within the record. A syntax for describing records may be employed. For example, the syntax may include a datatype indicator ("W" as viewed in FIG. 3A), a position in the record (e.g., 0-based index), and a property name (e.g., "Columns", "SeqNo", "Flags", "Flags2" as viewed in FIG. 3A). However, any suitable syntax may be employed. The syntax is used to describe the structure of many different record types, even though the records may be handled by the same record class.

Rules field 54 indicates situations where a prioritized queue is used for queuing records expected to be subsequently encountered in the binary file or data stream. The rules in this field enable specification of which records are expected to follow the current record. A syntax for describing the rules may be employed. For example, the syntax may include an identification of the expected record (e.g., "VIEW_COLUMN_FORMAT" as viewed in FIG. 3A), the number of repetitions of that record (e.g., obtained from the "Columns" field of the current record as viewed in FIG. 3A), and a priority or bucket number for the prioritized queue (e.g. "0" as viewed in FIG. 3A). Subsequent rules (e.g., for VIEW_TABLE_FORMAT3, VIEW_TABLE_FORMAT4, and CDMAYBE as viewed in FIG. 3A) may enable queuing of records with varying priorities (e.g., with priorities 1, 3, and 4 as viewed in FIG. 3A). The rules may further include various conditions based on values or other properties of record fields (e.g., the rule for "VIEW_TABLE_FORMAT3" in FIG. 3A includes a condition specification "Flags2&40", where the record is required if the result of an AND operation of the Flags2 field with 40 hex is non-zero). The analysis module utilizes the rules to identify expected records and insert those records at appropriate locations within the prioritized queue to determine the sequence of expected records as described below.

Comment field 56 is used for the production of a report, and typically includes a string to be placed in the report. The string may refer to a property name (e.g., "<Columns> cols" as viewed in FIG. 3A refers to the property "Columns" enclosed in the angle brackets), thereby enabling construction of a string which identifies the record and/or provides relevant information (e.g., the number of columns within the view as viewed in FIG. 3A). Ignore field 58 defines rules indicating the parts (e.g., any portion or an entirety of a record field) of the record to be ignored for comparisons (e.g., the field "SeqNo" may be ignored for comparisons; and "Flags&=FBFF" indicates that the value of the bit which is zero in the mask value of FBFF hex is to be ignored for comparisons as viewed in FIG. 3A). Alignment field 60 indicates whether the record is aligned on a word or other application specific boundary.

The record definition syntax may further allow for the definition of a generic record type with a rule to calculate the length based on some record header bytes (without details of the contents). In files where such a length determination rule is possible, this allows record types not relevant to the task to be ignored without having to create a definition for each one. The record definitions may alternatively be in the form of any suitable data or other structure, include any suitable information for an application, and be stored in any fashion. For example, the ignore field may be present for applications requiring comparisons, and may be omitted for other applications.

Once the header record is identified as determined at step 22 (FIG. 2A) and extracted, an indicator for the header record is placed in an initial bucket within a prioritized queue 18 (FIG. 3B) at step 23. In particular, prioritized queue 18 includes a series of buckets or sections 19 each associated with a priority or bucket number and containing an ordered sequence of records. The rules within rules field 54 each specify an expected subsequent corresponding record, the quantity of repetitions for the expected subsequent record, and the particular bucket for the expected subsequent record as discussed above. The expected subsequent records are inserted into the specified buckets 19 of prioritized queue 18 in accordance with the rules in rules field 54. The records are inserted into the respective buckets in locations after other records already residing in that bucket.

Buckets 19 are specified within the rules to enable sufficient room to exist between the buckets in order to accommodate the types of records that may be encountered later. In other words, the buckets specified in the rules are spaced to permit later encountered records to be inserted between other records in the prioritized queue. If insufficient space exists for insertion of a new record in the prioritized queue, the buckets may be renumbered. Generally, the bucket specifications provide a fair margin of space in order to accommodate insertion of any new records.

Figure 3B:
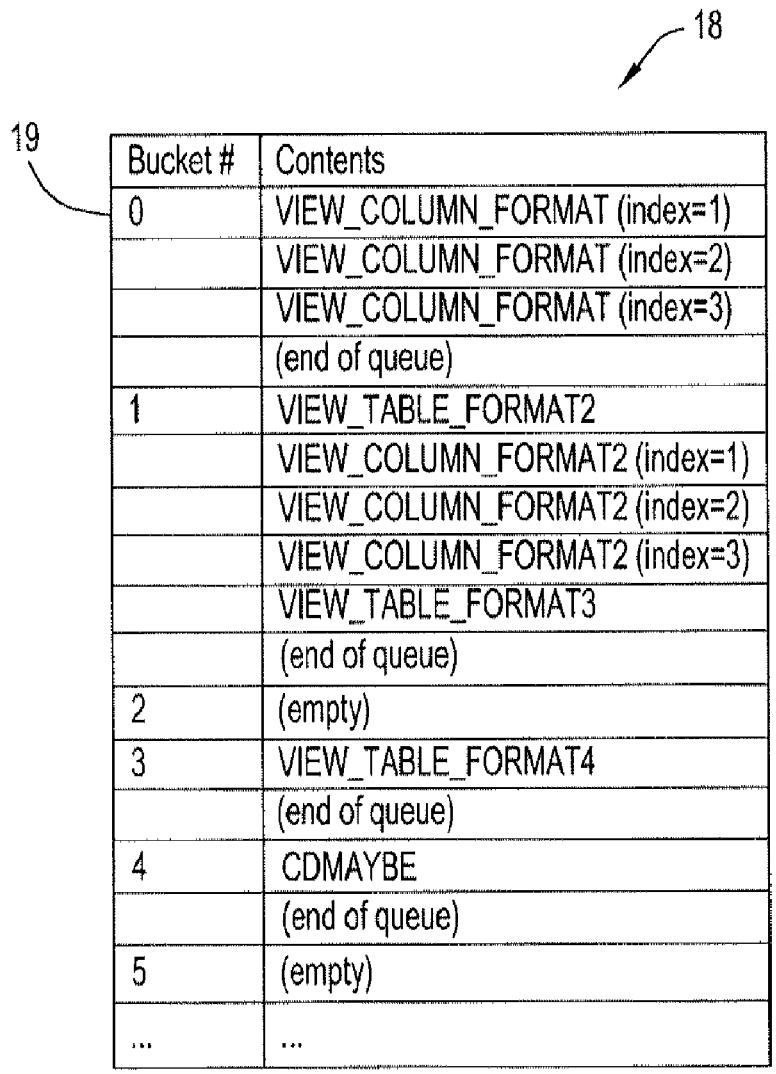
FIG. 3B is an illustration of an example prioritized queue used to indicate an expected record sequence according to an embodiment of the present invention.

When a property name is used to specify the quantity of repetitions for a record within a rule (e.g., "Columns" as viewed in FIG. 3A), an index is assigned to the new record to indicate the repetition of the record (e.g., the entries for VIEW_COLUMN_FORMAT in bucket 0 and VIEW_COLUMN_FORMAT2 in bucket 1 each indicate corresponding indices 1, 2, and 3 as viewed in FIG. 3B). These indices may be used to locate related records in a later stage of processing (e.g., the VIEW_COLUMN_FORMAT record for column/index 2 may contain information relevant to the processing of the VIEW_COLUMN_FORMAT2 record for column/index 2). The rule syntax may further support various other references such as, for example, "the record of type D at the same index as me" or "field K in my parent record".

By way of example, prioritized queue 18 of FIG. 3B represents the queue after analyzing a VIEW_TABLE_FORMAT record according to the record definition of FIG. 3A (e.g., with Columns=3 and the condition Flags2 & 40 hex being true). The rule for VIEW_COLUMN_FORMAT (e.g., VIEW_COLUMN_FORMAT/Columns/0 as viewed in FIG. 3A) indicates a record repetition of three (e.g., the value of Columns) and placement in bucket 0. Prioritized queue 18 shows three of these records in that bucket.

The rule for VIEW_TABLE_FORMAT2 (e.g., VIEW_TABLE_FORMAT2/1/1 as viewed in FIG. 3A) indicates a record repetition of one and placement in bucket 1, while the rule for VIEW_COLUMN_FORMAT2 (e.g., VIEW_COLUMN_FORMAT2/Columns/1 as viewed in FIG. 3A) indicates a record repetition of three (e.g., the value of Columns) and placement in bucket 1. Further, the conditional rule for VIEW_TABLE_FORMAT3 (e.g., Flags2 & 40 hex VIEW_TABLE_FORMAT/1/1 as viewed in FIG. 3A) indicates a record repetition of one and placement in bucket 1. Prioritized queue 18 shows each of these records in bucket one with VIEW_COLUMN_FORMAT2 occurring three times.

The rule for VIEW_TABLE_FORMAT4 (e.g., VIEW_TABLE_FORMAT4/1/3 as viewed in FIG. 3A) indicates a record repetition of one and placement in bucket 3, while the conditional rule for CDMAYBE (e.g., CDMAYBE: FFF6 hex, FF71 hex/1/4 as viewed in FIG. 3A) indicates a record repetition of one and placement in bucket 4. Prioritized queue 18 shows these records in their corresponding buckets. Since buckets 2 and 5 are not specified, these buckets remain empty.

Thus, the prioritized queue basically represents a layout of the expected record sequence within the binary file or data stream. When record definitions are retrieved for comparison with retrieved binary data, the definitions for records within the queue are initially retrieved for the comparison since these records are expected within the binary file or data stream. The definitions are retrieved by traversing the prioritized queue in bucket or priority order and retrieving a definition for a record from the first non-empty bucket. The prioritized queue may alternatively be implemented by any suitable data or other structure, and may include any quantity of buckets or sections labeled in any fashion, where the expected subsequent or other records may be stored in the prioritized queue in any order or manner.

Referring back to FIG. 2A, if no header record is present as determined at step 22, or after a header record is inserted into prioritized queue 18 at step 23, the prioritized queue is examined to determine the presence of entries at step 24. When the prioritized queue is empty, binary data is retrieved and analyzed at step 26 to identify a corresponding record definition for the retrieved binary data. If a corresponding record definition is identified for the retrieved binary data as determined at step 27, the binary data is determined to be a record according to the corresponding record definition at step 29. When a record definition cannot be identified as determined at step 27, an error condition is raised at step 28 (e.g., notify a user, etc.) and the process terminates.

If prioritized queue 18 contains entries as determined at step 24, the record definition corresponding to the first available entry (e.g., an entry in the first or highest priority bucket containing an entry) in the prioritized queue is identified at step 25. Once a corresponding record definition (e.g., from either the prioritized queue or analysis of the record definitions) is identified, the record is extracted from the binary data according to the identified record definition and loaded into a record object at step 30.

When the record indicates expected subsequent records within the data stream (e.g., contains rules indicating the presence of expected subsequent records within rules field 54), the rules are processed at step 31 in order to determine expected subsequent records within the binary file or stream. Indicators (e.g., record name, record definition, etc.) for the expected subsequent records are placed in prioritized queue 18 (FIG. 3B) in the appropriate buckets specified by the rules. Once the rules are processed, the analysis module determines the presence of additional binary data at step 32.

When additional binary data exists in the binary file or data stream as determined at step 32, the prioritized queue is checked for entries (e.g., at step 24) to retrieve the next record in the binary data file or stream as described above. Once the binary data has been processed as determined at step 32, a representation of the records within the binary file is generated from the extracted information (e.g., record objects) and stored at step 33. The representation of the records is associated with the assigned reference names (e.g., record names, property or record field names, etc.) in the record definitions, thereby enabling the analysis module to identify and provide discernable information about the extracted records to the user.

The architecture of the system is preferably implemented based on object-oriented design principles, where the parts of the operation that derived classes may need to override are identified and implemented as separate object-oriented methods for maximum flexibility. Several datatypes are pre-defined for properties and indicated by the type code in the initial portion of property field entries (e.g., "W" as viewed in FIG. 3A). The pre-defined datatypes, by way of example, include Byte (e.g., specified with a position), Word (e.g., specified with a position), Doubleword (e.g., specified with a position), Miscellaneous structure (e.g., specified with a position and length), Fixed-length, null terminated string (e.g., specified with a position and a length, and may further specify the character set (e.g., ASCII, etc.), Variable length string (or binary object) (e.g., whose starting position is fixed but the length is given by another byte or word in the record; this is specified by the starting position, position of the length word/byte, a boolean flag indicating whether the length is a word or byte, and a boolean flag indicating whether the string is packed, or whether the string may have a fill byte at the end to force the string to be an even number of bytes), and Variable length entity (e.g., whose starting position and length are both variable, and with the addition of a property name that this property follows).

The implementation of the pre-defined property classes or datatypes depends on the order of data in the records (e.g., least or most significant byte first); however, an implementation must support both based on an option associated with the file type (and there may additionally be an option to make an exception for a particular record type). Both may be supported by including two versions of each class, or an option flag in the signature record to indicate the order of data.

The pre-defined datatypes include ones whose positions and lengths are not fixed. The lengths may depend on other fields within the record, and the position may be based on a variable offset from a fixed location, where the offset is based on the lengths of other preceding properties. During processing of the binary file or data stream, a variable-length property may need to be re-assigned to a different value. With respect to fields of fixed length and position, the bytes in question are overwritten. However, when assigning a variable-length field, the data in other subsequent variable-length fields are moved, the record storage buffer is reallocated to a different length and bytes are shifted around. In addition, variable-position fixed-length data may be further supported.

Binary records often contain substructures that may be shared in common with other records. Accordingly, additional property or datatypes may be defined for economy of notation when defining the record structures or definitions, and to avoid having to define the same comparison rules in ignore field 58 whenever one of these substructures is encountered. Although new classes may be created that are derived from the property definition base class, new types and behaviors may be defined just by editing the configuration information. This is used to extend the list of known property datatypes without writing custom program code.

For example, an NFMT structure may be used in several places in element definitions for an application. The structure describes a manner to convert numbers to text in a given situation, and includes fields for digits, format, attributes, and unused. The last byte of this structure is always unused, while the digits field is only used if the number is to be displayed in fixed format (e.g., based on the value of a bit flag in the attributes field). Thus, for each reference to this structure, the unused byte should be ignored, the digits byte should also be ignored depending on the attributes field. This behavior may be handled through a datatype definition similar to the record definition described above. The datatype definition includes a datatype field, a class field, a properties field, and an ignore field. The datatype field includes a name for the datatype in order to reference this datatype. The class, property and ignore fields are substantially similar to the fields described above for the record definition. If a class is not explicitly named, a generic property class is used. The syntax for properties and ignore rules are substantially similar to the syntaxes described above. User-defined datatypes may also reference other user-defined datatypes that were defined previously.

The user-defined datatype may be utilized in the record definitions (FIG. 3A) by referring to the datatype name. For example, the properties field for a record definition may include the datatype NFMT in one or more entries. Since the definition of NFMT describes the rules for determining which parts of that subrecord can be ignored, the rules are not repeated in the ignore field of the record definition, but are automatically applied to that portion of the record. A member of the user defined datatype may be referenced using dot notation (e.g., NMFT.Attributes) to utilize the value of that field in one of the record rules.

The user-defined datatype functionality enables encapsulation and reuse of functionality in different record types. Since the user-defined datatype can also refer to a derived class, this allows great flexibility in performing specialized processing at the sub-record level, without requiring a special derived class each time.

The rule definition syntax supports reference to other records in the binary file or data stream. This may be accomplished by a dot syntax (e.g., recordname.propertyname refers to the field propertyname in the record identified by recordname). The references may be cascaded, and the same syntax may be used for a reference to a field in a subrecord. The rule definitions may further include pre-defined expressions that may be used to refer to other records in the binary file or data stream. For example, the expressions may include prev (e.g., the record immediately preceding the current record in the binary stream), parent (e.g., the record that caused the current record to be added to the prioritized queue), child (e.g., the record that is referenced by the current record), *name (e.g., the name of a record (from the description field of the record definition table) that refers to the most recent record of that type; however, if the index property of the current record is assigned, and the referred to record also has an index property, the record with the matching index is returned), #name (e.g., the name of a record referring to the descendant of the current record whose record type is name; if there are multiple records of this type, the one whose index value matches the index of the record containing the rule is used). For example, referring to the example in FIG. 3B, the record VIEW_COLUMN_FORMAT2 (index=2) may refer to the sibling record VIEW_COLUMN_FORMAT (index=2) by the expression parent.# VIEW_COLUMN_FORMAT. propertyname. In addition, the syntax may support referencing of sibling records (e.g. the first record of type AA which is a sibling of the current record may be referenced by parent. child ("AA")).

The resulting record representation from the analysis of the binary file or data stream may be utilized for various applications including extraction of certain types of data. For example, text may be extracted from the binary file or data stream that can be indexed for use by a search engine. In this case, fields are identified as either textual for retrieval of the data, or as non-textual in order to be skipped, and the configuration file may include rules for determining the character set of string data properties.

Figure 4:
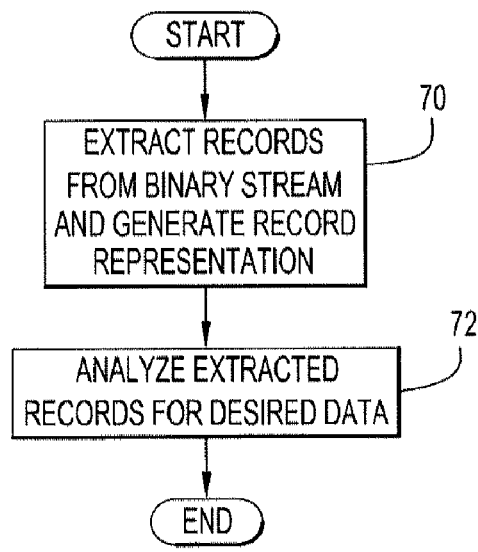
FIG. 4 is a procedural flowchart illustrating a manner in which record structures within a binary file may be examined for desired data according to an embodiment of the present invention.

An example manner of analysis module 16 (e.g., via server system 10 and/or client system 14) further extracting certain data from a binary file or data stream according to an embodiment of the present invention is illustrated in FIG. 4. Specifically, the binary file or data stream is analyzed and a record representation is generated at step 70 in substantially the same manner described above (e.g., FIGS. 2 and 3A-3B). Since the record representation is generated, the fields of the records and corresponding data can be identified (e.g., type of data in the fields, the subject matter of the data (e.g., name, address, etc.), etc.) and referenced (e.g., field names, etc.) based on the corresponding record definitions. Accordingly, the desired data is identified within the record representation and extracted at step 72 for the particular application (e.g., retrieve sensitive information, retrieve text information to be indexed for a search engine, retrieve particular information (e.g., name, address, etc.), etc.).

The resulting record representation from the analysis of the binary file or data stream may further be utilized for comparing files and providing meaningful information pertaining to the differences between the files (e.g., providing references to fields and/or data a user can understand). In other words, the fields and data may be identified and labeled in a manner meaningful to the user.

Figure 5:
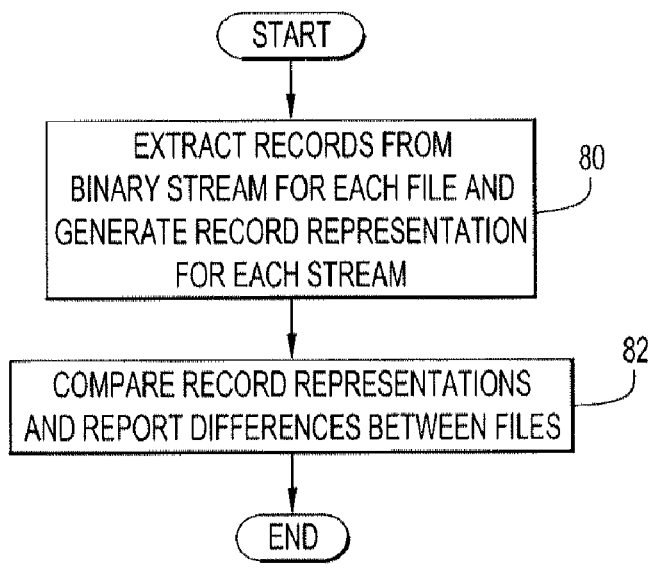
FIG. 5 is a procedural flowchart illustrating a manner in which files may be compared according to an embodiment of the present invention.

An example manner of analysis module 16 (e.g., via server system 10 and/or client system 14) further comparing files according to an embodiment of the present invention is illustrated in FIG. 5. Specifically, the binary version or data stream of each file under comparison is analyzed and record representations for each of the files is generated at step 80 in substantially the same manner described above (e.g., FIGS. 2 and 3A-3B). Since the record representation is generated, the fields of the records and corresponding data can be identified (e.g., type of data in the fields, the subject matter of the data (e.g., name, address, etc.), etc.) and referenced (e.g., field names, etc.) based on a corresponding record definition.

Once the record representations for each file are generated, the record representations are compared to each other to identify differences and the differences are reported to a user at step 82. The differences between the files are referenced by names and other descriptors in the corresponding record definitions to provide meaningful information to the user. For example, a difference in a field of a record is reported using the record name and field name assigned to these items in the corresponding record definitions. This application may be utilized to compare different files (e.g., similar record structures in different file formats, etc.), or different versions of the same file.

In addition, comparison of original data with translated data may be supported to determine functional equivalency between original and translated records for systems that translate complex streams of binary record data into an alternate representation (e.g., XML, etc.) and back into binary data. In other words, differences are identified that affect the behavior of a system using binary record data to control its operation. This is useful in testing the translation process for errors that would affect operation.

Basically, differences between the original and translated records are automatically categorized as either significant (to be reported) or insignificant (to be ignored). The ignored differences may be on the level of a single bit or byte, may involve variant versions of the same record (e.g., produced by different versions of a software system), may include fields whose position and length within the record are variable, and may include whole records which may be present in the original set of records and missing in the translated set or vice versa. The information to determine whether a difference is significant may be in the same record or in a previous record.

Figure 6:
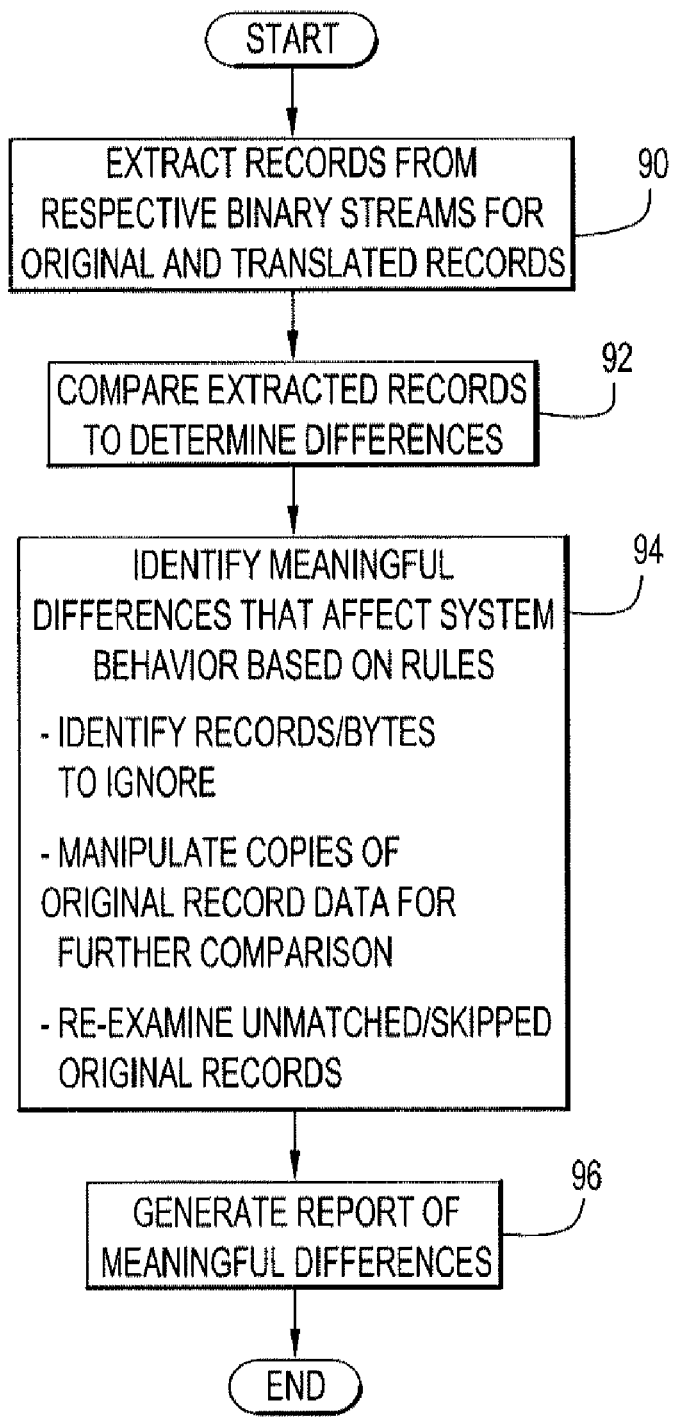
FIG. 6 is a procedural flowchart illustrating a manner in which translated records within a binary stream may be compared to the original records to determine functional equivalency according to an embodiment of the present invention.

An example manner of analysis module 16 (e.g., via server system 10 and/or client system 14) further comparing original and translated records according to an embodiment of the present invention is illustrated in FIG. 6. Initially, the analysis process may result in various match statuses for a record that are utilized to generate the report. The status of the records, by way of example, include: matched (e.g., a corresponding record was found in the translated stream and the contents of the records are identical for purposes of functional equivalency); mismatched (e.g., the record is flagged as an exception or meaningful and appears in the report; this status is assigned during comparison of the records); ignorable (e.g., indicating a record in the original stream that is not expected to appear in the translated stream; however, since there is still a record, the record is listed in abbreviated form and highlighted as a difference in the report since the record does not appear in each stream. An indication may be added to such records that the difference may be ignored); open (e.g., no match is found as yet, but the existence of a problem is unknown; this is the default status, where survival of the status through the comparison indicates that the record appeared in one stream and not the other, and the record is added to the report in the same way as a mismatched record); and optional (e.g., records that may be ignored based on rules in the ignore field). The status of the records are initially set to open, and modified in accordance with the results of the comparison.

Specifically, the binary versions or data streams of the original records and the translated records are analyzed and record representations for each of the streams is generated at step 90 in substantially the same manner described above (e.g., FIGS. 2 and 3A-3B). Since the record representation is generated, the fields of the records and corresponding data can be identified (e.g., type of data in the fields, the subject matter of the data (e.g., name, address, etc.), etc.) and referenced (e.g., field names, etc.) based on the corresponding record definition.

Once the record representations for each file are generated, the record representations are compared to each other to identify differences at step 92. In particular, the original and translated record representations are examined to identify entire records that may be ignored, records having unused bytes (e.g., based on values in other parts of that or previous records), and original records not expected in the translated stream. This determination may be based on the rules in the ignore fields of the corresponding record definitions. For example, the ignore field may list the record name or each field of the record to indicate that the entire record is to be ignored for the comparison. Similarly, the rules in the ignore fields may indicate the bytes that are unused. The rules are stored in an external configuration table or file (not in the source code) as described above to enable the behavior to be easily modified without writing program code. Identified records are flagged (e.g., a record status of optional (for ignored records) or ignorable (for unexpected records)), while ignored bytes are overwritten with default values to prevent those values from affecting the comparison.

Once the identified records have been flagged, the record representations of the original and translated records are compared to determine differences that affect system behavior based on the rules in the ignore fields of the corresponding record definitions at step 94. In particular, the remaining or non-flagged records of the original and translated streams are compared, preferably as a pair including one record from each of the original and translated record sets. The record comparison includes the fields of the records not specified by the rules in the ignore fields of the corresponding record definitions to identify meaningful differences between the records (e.g., differences that affect system behavior). Records with matching fields are flagged (e.g., record status of matched) as being functionally equivalent.

If an original record and a translated record are of the same type but not identical, the data of the original record is manipulated for further comparison. A temporary copy of the original record data or shadow record is generated and manipulated. If the manipulated shadow record matches the translated record, the corresponding original record is flagged as a match (e.g., a record status of matched). The separate copy enables the original record data to be maintained intact to enable display of the original record data as part of the report in case differences are found. The manipulated data is retained until completion of the comparison for use in comparison against subsequent records.

The manipulation of the shadow record data is primarily based on configurable rules (with an option to augment the behavior with program code in a derived class of the record base class). The manipulation supports the reassignment of variable-length properties via configurable rules (e.g., moving the following data around in the temporary copy to enable a byte-by-byte comparison and subsequently determine whether the records are functionally equivalent). The base record class includes the functionality to generate the temporary copy and perform the manipulation. Any additional changes may be made by a method of a class derived from the record base class. The manipulation and subsequent comparisons operate on the shadow record, where the original record data is not used again unless the full record contents must be displayed in the report.

With respect to the record comparisons, when an original record of a given pair does not match a record in the translated stream within range of a look ahead search (e.g., a certain quantity of records), the record status does not change (e.g., the record status remains open). However, if neither the original record nor translated record of the given pair matches a record in the other stream within range of the look ahead search (e.g., a certain quantity of records), both records are flagged as a mismatch (e.g., record status of mismatched).

After the record comparisons, the original records are re-examined to determine whether there are any original records that were skipped due to not matching a translated record. The skipped records are further tested to determine whether the skipped records contain important information (e.g., information that is not designated as being ignored). When a skipped record does not contain important information, the record is marked (e.g., a record status of optional) and omitted from the report of differences. Otherwise, the record status is unchanged (e.g., the record status remains open).

Once the differences between the original and translated records are determined, a report is generated at step 96 that succinctly describes the differences in a manner meaningful to the user. The report lists the original and translated records adjacent each other, where ignored records (or records containing only ignored fields) are omitted from the report (e.g., a status of optional). Accordingly, when all compared elements are identical (e.g., status of matched), a passing indication may be presented without output to examine. However, when differences are identified (e.g., status of mismatched or open), the differences are highlighted and enough contextual information is provided about the parts of the records and/or data that do match in order to enable the user to locate erroneous data in a different context (e.g. in a GUI interface where the user edits the binary data). The identification of records for the report is based on the status of the records determined during the comparison. Various text-difference tools may be utilized to display the results (e.g., WINDIFF, WINMERGE, etc.).

Figure 7:
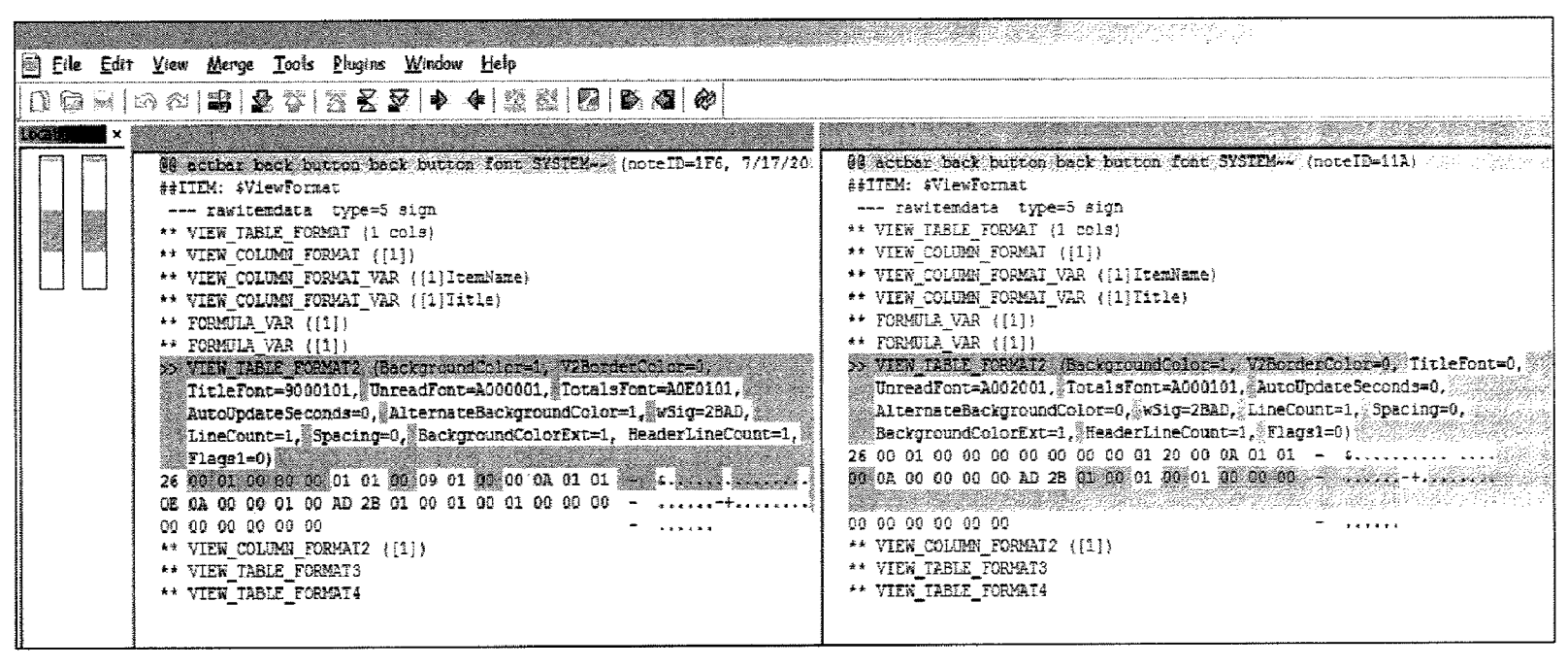

An example report is illustrated in FIG. 7. By way of example, the flag "" is utilized to indicate a record that was the same in the original and translated record sets (e.g., a record status of matched). The information provided for these records includes the record name and any properties that have been identified in the comments field of the corresponding record definition. For example, the VIEW_COLUMN_FORMAT record (as viewed in FIG. 7) is followed by the term "([1])" which indicates that the record is associated with column 1 of the view. Since there are no significant differences in the original and translated record data, detailed information providing the values of all the fields, and a dump of hex data are not included. The term ">>" indicates a record that is different in or missing from the translated record set (e.g., a record status of mismatched or open). In this case, the differences are highlighted, where the first difference is in the TitleFont property (e.g., as viewed in FIG. 7**).

The use of the shadow record for manipulations of the original record data may result in records that have visible differences when displayed in the report, but whose values are actually considered as being equivalent. Accordingly, when the value of a property is changed, the changed and original values are stored and both are displayed in the report. For example, if the original value of TitleColor is 0 and the value is subsequently changed to 4 in a corresponding shadow record, the report displays "TitleColor=0(4)" for the original record and "TitleColor=4" for the translated record. Although this would be identified as a difference in the texts, the user would be readily notified that this difference is not the reason the record is presented, and would look for the other changed field.

It will be appreciated that the embodiments described above and illustrated in the drawings represent only a few of the many ways of implementing embodiments for analyzing binary data streams to identify embedded record structures.

The topology or environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, etc.), and may include any commercially available operating system and any commercially available or custom software (e.g., browser software, communications software, server software, analysis software, etc.). These systems may include any types of monitors and input devices (e.g., keyboard, mouse, voice recognition, etc.) to enter and/or view information.

It is to be understood that the software (e.g., analysis module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., analysis module, etc.) may be available on a recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., record representations, configuration table, configuration file, record definitions, etc.). The storage structures may be remote from or local to the computer or other processing systems.

The present invention embodiments may analyze any type of data file or stream to extract information therefrom (e.g., binary, encoded or encrypted, symbol stream, etc.). The stream may contain any suitable data or data structures (e.g., records, lists, arrays, queues, stacks, etc.). Similarly, the record definitions may provide the structure for any types of data structures, data formats, or data arrangements that may be contained within the data file or stream. The record definitions may include any desired information about a data structure (e.g., fields, arrangement, structure, descriptors, etc.) arranged in any fashion.

The record definitions may be stored in and accessed from any suitable storage unit or structure (e.g., table, file, database, etc.), where the record definitions may be arranged in any fashion within that structure (e.g., based on file type, record type, etc.). The system may employ any quantity of record definitions to cover any quantity of expected data structures within the data file or stream. The syntax for defining the record or other structure fields within the record definitions may utilize any suitable syntax with any quantity of any type of alphanumeric or other characters or symbols arranged in any fashion.

The rules for expected records and ignoring fields may be of any quantity and indicate any suitable conditional or unconditional rules for these items. The syntax for defining the rules may utilize any suitable syntax with any quantity of any type of alphanumeric or other characters or symbols arranged in any fashion. The rules for ignoring fields may alternatively indicate the fields desired for consideration for the comparisons. The rules may indicate any suitable criteria for expecting records, ignoring or considering fields, or performing other actions (e.g., manipulating data for the shadow record, etc.).

The representation of the record may include any suitable information arranged in any fashion to provide the structure of a record or other structure extracted from the data file or stream. Any suitable desired data may be retrieved from the extracted record and provided to a user or application. The extracted information and/or comparison results may be labeled in any fashion by any suitable descriptors to provide meaningful information to a user.

The comparisons between original and translated records may be accomplished in any suitable manner (e.g., record by record, two or more records, etc.). The comparisons may further be between an original set of records or other structures and a later version of those records that have been processed in any manner, or between any two sets of records or other structures. The comparison status may include any suitable status or indicator to provide information pertaining to the results of a comparison for the record (e.g., matched, unmatched, missing, ignored, etc.).

The architecture may include any suitable classes and objects arranged in any fashion. The classes may include any suitable methods (e.g., generic and/or custom, etc.) to perform the functions described above. The architecture may be implemented in any suitable programming architecture (e.g., object-oriented, etc.).

The data file or stream may be compared to record definitions in any desired fashion (e.g., byte by byte, sections or fields, etc.). The notification of an error condition may be in any desired format, and include any desired information. The prioritized queue may be implemented by any suitable data or other structure (e.g., queue, list, array, stack, etc.). The prioritized queue may include any quantity of buckets or sections each having the storage capacity to contain any desired quantity of records. The priorities may be indicated by any suitable numeric, alphanumeric or other characters or symbols capable of indicating an order. The priorities may be ordered based on highest or lowest values (e.g., the lowest value may indicate the highest priority, the highest value may indicate the highest priority, etc.). The sections may be re-labeled via any suitable techniques (e.g., increase offsets between sections, etc.). Any desired identifiers or indicators may be placed in the prioritized queue to indicate the expected records or any other information (e.g., expected data values or fields, etc.). The prioritized queue may be may be implemented in hardware (e.g., memory device, buffer, etc.), software (e.g., queue, stack, linked list, array, etc.), or any combination thereof. The prioritized queue may utilize any desired scheme for placement and removal of the expected records or other data from the queue (e.g., FIFO, LIFO, etc.). The buckets specified in the rules may be spaced or offset in any desired manner to enable insertion of intermediate records in the prioritized queue.

The present invention embodiments may employ any number of any type of user interface (e.g., Graphical User Interface (GUI), command-line, prompt, etc.) for obtaining or providing information (e.g., obtaining information for the desired analysis to be performed, providing the report, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion (e.g., pertaining to matches and/or differences, pertaining to the extracted fields and/or data, ignored fields, matched fields, etc.). The report may provide any suitable information from any quantity of records (e.g., the original record, the translated or processed record, both of these records, any suitable descriptor for the fields, any values of the fields, etc.). The report may be generated based on any suitable status of records from the comparisons (e.g., the status may indicate which records/differences to display, etc.). The report may similarly be configurable based on rules or other criteria to provide desired information to a user (e.g., desired records, differences, fields, data, etc.).

The present invention embodiments are not limited to the specific tasks or algorithms described above, but may be utilized for extracting any type of information from any data file or stream for any suitable application. For example, present invention embodiments may be employed for extracting record or other data structures from a binary or other data stream for retrieving desired data from that stream, comparing files reduced to the data streams (e.g., comparing versions of programs or other code, etc.), or determining functional equivalency between data sets (e.g., data structures, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of identifying and extracting data structures embedded within a data stream of binary data comprising:
   analyzing the data stream of binary data including a data file with a plurality of different types of data structures and identifying data structure definitions corresponding to analyzed data stream portions, wherein the data structure definitions each define a structure and arrangement of a corresponding data structure, map fields of the corresponding data structure to binary data, and are configurable to accommodate various types of data structures within the data stream; and
   generating the corresponding data structures of the data file from the binary data within the data stream by extracting information from the data stream in accordance with the identified data structure definitions.

2. The computer-implemented method of claim 1, wherein at least one data structure definition indicates one or more other data structures expected subsequently within the data stream, and the method further includes:
   generating a representation of a sequence of the expected data structures within the data stream by storing indicators of the expected data structures in corresponding sections of a storage unit, wherein the storage unit sections are each associated with a corresponding location within the sequence;
   wherein the identifying data structure definitions includes comparing the analyzed data stream portions to data structure definitions corresponding to the expected data structures within the storage unit.

3. The computer-implemented method of claim 1, wherein the data structures embedded in the data stream include records.

4. The computer-implemented method of claim 1, further including:
   examining the generated data structures to retrieve certain types of data contained in the data structures.

5. The computer-implemented method of claim 1, wherein the data stream includes a plurality of data files and the data structures for each file are generated, and wherein the method further includes:
   comparing the generated data structures for each file to determine differences between the files; and
   reporting the differences between the files using descriptors for the data structures discernable by a user, wherein the data structure definitions corresponding to the generated data structures include the descriptors.

6. The computer-implemented method of claim 1, wherein the data stream includes a first set of data structures and a second set of data structures and the data structures for each set are generated, and wherein the method further includes:
   comparing the generated data structures for each set to determine differences between the sets that affect operation of a system.

7. The computer-implemented method of claim 6, wherein the data structure definitions for the first and second sets of data structures indicate portions of the data structures for use in the comparison to determine the differences that affect operation of the system.

8. The computer-implemented method of claim 6, wherein the comparing the first and second sets of data structures includes:
  generating copies of data within ones of the first set of data structures being of the same type but not identical to data structures within the second set; and
  manipulating the data within the data copies and comparing the manipulated copies to the second set of data structures to determine the differences.

9. A system for identifying and extracting data structures embedded within a data stream of binary data comprising:
  a computer system including at least one processor configured to:
    analyze the data stream of binary data including a data file with a plurality of different types of data structures and identify data structure definitions corresponding to analyzed data stream portions, wherein the data structure definitions each define a structure and arrangement of a corresponding data structure, map fields of the corresponding data structure to binary data, and are configurable to accommodate various types of data structures within the data stream; and
    generate the corresponding data structures of the data file from the binary data within the data stream by extracting information from the data stream in accordance with the identified data structure definitions.

10. The system of claim 9, wherein at least one data structure definition indicates one or more other data structures expected subsequently within the data stream, and the at least one processor is further configured to:
  generate a representation of a sequence of the expected data structures within the data stream by storing indicators of the expected data structures in corresponding sections of a storage unit, wherein the storage unit sections are each associated with a corresponding location within the sequence;
  wherein the identifying data structure definitions includes comparing the analyzed data stream portions to data structure definitions corresponding to the expected data structures within the storage unit.

11. The system of claim 9, wherein the data structures embedded in the data stream include records.

12. The system of claim 9, wherein the at least one processor is further configured to:
  examine the generated data structures to retrieve certain types of data contained in the data structures.

13. The system of claim 9, wherein the data stream includes a plurality of data files and the data structures for each file are generated, and wherein the at least one processor is further configured to:
  compare the generated data structures for each file to determine differences between the files; and
  report the differences between the files using descriptors for the data structures discernable by a user, wherein the data structure definitions corresponding to the generated data structures include the descriptors.

14. The system of claim 9, wherein the data stream includes a first set of data structures and a second set of data structures and the data structures for each set are generated, and wherein the at least one processor is further configured to:
  compare the generated data structures for each set to determine differences between the sets that affect operation of a system.

15. The system of claim 14, wherein the data structure definitions for the first and second sets of data structures indicate portions of the data structures for use in the comparison to determine the differences that affect operation of the system.

16. The system of claim 14, wherein the comparing the first and second sets of data structures includes:
  generating copies of data within ones of the first set of data structures being of the same type but not identical to data structures within the second set; and
  manipulating the data within the data copies and comparing the manipulated copies to the second set of data structures to determine the differences.

17. A computer program product for identifying and extracting data structures embedded within a data stream of binary data comprising:
  a computer readable storage medium having computer readable program code embodied therewith, the computer readable program code comprising computer readable program code configured to:
    analyze the data stream of binary data including a data file with a plurality of different types of data structures and identify data structure definitions corresponding to analyzed data stream portions, wherein the data structure definitions each define a structure and arrangement of a corresponding data structure, map fields of the corresponding data structure to binary data, and are configurable to accommodate various types of data structures within the data stream; and
    generate the corresponding data structures of the data file from the binary data within the data stream by extracting information from the data stream in accordance with the identified data structure definitions.

18. The computer program product of claim 17, wherein at least one data structure definition indicates one or more other data structures expected subsequently within the data stream, and the computer readable program code further includes computer readable program code configured to:
  generate a representation of a sequence of the expected data structures within the data stream by storing indicators of the expected data structures in corresponding sections of a storage unit, wherein the storage unit sections are each associated with a corresponding location within the sequence;
  wherein the identifying data structure definitions includes comparing the analyzed data stream portions to data structure definitions corresponding to the expected data structures within the storage unit.

19. The computer program product of claim 17, wherein the data structures embedded in the data stream include records.

20. The computer program product of claim 17, wherein the computer readable program code further includes computer readable program code configured to:
  examine the generated data structures to retrieve certain types of data contained in the data structures.

21. The computer program product of claim 17, wherein the data stream includes a plurality of data files and the data structures for each file are generated, and wherein the computer readable program code further includes computer readable program code configured to:
  compare the generated data structures for each file to determine differences between the files; and
  report the differences between the files using descriptors for the data structures discernable by a user, wherein the data structure definitions corresponding to the generated data structures include the descriptors.

22. The computer program product of claim 17, wherein the data stream includes a first set of data structures and a second set of data structures and the data structures for each set are generated, and wherein the computer readable program code further includes computer readable program code configured to:
compare the generated data structures for each set to determine differences between the sets that affect operation of a system.

23. The computer program product of claim 22, wherein the data structure definitions for the first and second sets of data structures indicate portions of the data structures for use in the comparison to determine the differences that affect operation of the system.

24. The computer program product of claim 22, wherein the comparing the first and second sets of data structures includes:
generating copies of data within ones of the first set of data structures being of the same type but not identical to data structures within the second set; and
manipulating the data within the data copies and comparing the manipulated copies to the second set of data structures to determine the differences.

* * * * *